United States Patent [19]
Eisele et al.

[11] 3,830,663
[45] Aug. 20, 1974

[54] BATTERY HOLDER FOR SATELLITE AND METHOD

[75] Inventors: John A. Eisele, Hillcrest Heights, Md.; Francis J. Campbell, Alexandria; Bruce J. Faraday, Annadale, both of Va.; Richard L. Statler, Clinton, Md.

[73] Assignee: The United States of America as represented by the Secretary of the Navy, Washington, D.C.

[22] Filed: Mar. 5, 1973

[21] Appl. No.: 337,981

[52] U.S. Cl. .............................. 136/166, 136/170
[51] Int. Cl. .......................................... H01m 1/02
[58] Field of Search ............ 136/166, 169, 170, 173

[56] References Cited
UNITED STATES PATENTS
2,876,273   3/1959   Hall .................................... 136/169
2,879,316   3/1959   Enikeiff .............................. 136/173

*Primary Examiner*—Winston A. Douglas
*Assistant Examiner*—H. A. Feeley
*Attorney, Agent, or Firm*—R. S. Sciascia; Arthur L. Branning; M. L. Crane

[57] ABSTRACT

This disclosure is directed to a battery holder for providing a thermal path from the battery to the skin of a satellite by which the heat may be distributed over the entire surface of the satellite.

3 Claims, 1 Drawing Figure

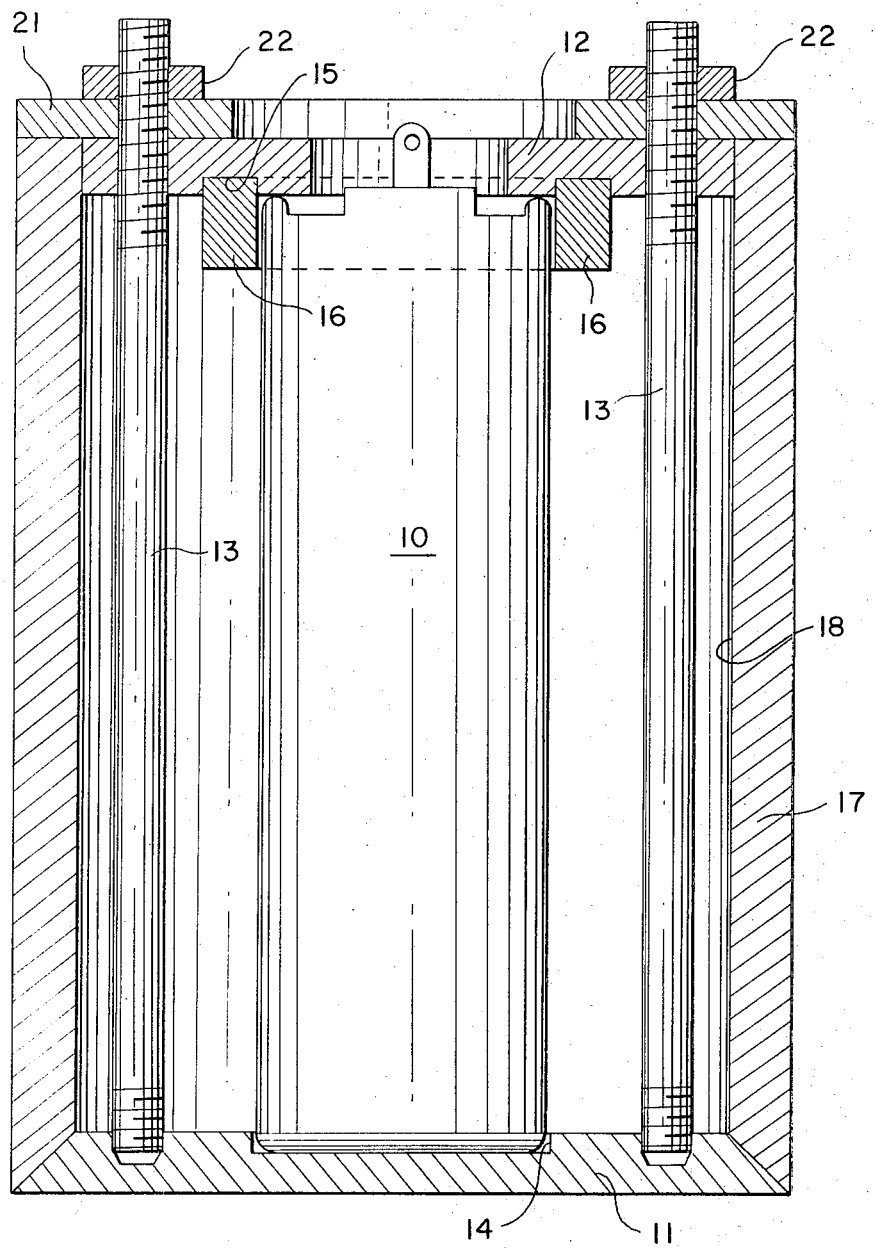

BATTERY HOLDER FOR SATELLITE AND METHOD

BACKGROUND OF THE INVENTION

This invention relates to storage batteries for satellite use and more particularly to a battery casing for evenly distributing heat from the battery over the entire skin surface of the satellite and for maintaining electrical isolation of the batteries from the remainder of the satellite system.

It is well known that batteries aboard a satellite serve in a dual capacity of storing electrical energy developed by solar cells on board the satellite and for redistributing the electrical energy to various electrical system as needed. Several satellite missions have failed due to battery failure brought about from overheating during the battery charging cycle. Simulated testing has shown that battery temperatures during charging has exceeded 50°C which caused outward buckling of the battery case.

Heretofore, nylon, polyethylene, or beryllia-filled plastic spacers have been used between the battery base and an aluminum plate surmounting an aluminum honeycomb and aluminum satellite skin to ensure electrical isolation of the batteries. The low thermal conductivity of the spacers provide a poor thermal path from the battery casing to the satellite skin. Further, the assembly of the battery holder requires rubber insulators between the battery casing and the holder which further restricts heat flow. Due to the poor thermal conductivity, the heat from the batteries is not dissipated sufficiently. Therefore, the batteries sometimes overheat during charging.

SUMMARY OF THE INVENTION

This invention provides a battery holder that permits the greatest amount of heat to pass from the battery through the holder and to the satellite body. The holder is made of a good heat conductor yet provides good electrical insulation. The holder holds the battery rigidly in place, yet it is sufficiently open to permit electrical connections to the battery top as well as heat to escape from the top.

STATEMENT OF THE OBJECTS

It is therefore an object of the present invention to provide a battery holder for a satellite storage battery which permits sufficient electrical insulation from the body while providing sufficient heat flow to prevent battery damage during charging or use.

Another object is to provide a storage battery holder for a satellite which is easily and quickly assembled and is less expensive than prior art types.

Still another object is to provide a battery holder which does not require a top plate thereby eliminating the requirement for rubber insulating washers as well as nylon protective washers.

Yet another object is to provide a storage battery holder which permits heat removal over the entire area of the holder rather than only at the bottom.

Other objects and advantages of the invention will become obvious from a reading of the specification in consideration with the drawing.

BRIEF DESCRIPTION OF THE DRAWING

The drawing illustrates a cross section view of a battery holder illustrated with a battery held in place.

DESCRIPTION OF THE DEVICE

Now referring to the drawing, there is illustrated a cross sectional view of a storage battery holder for a satellite made in accordance with the teaching of this invention. As shown, a storage battery 10 is held in position between a bottom plate 11 and an upper plate or ring 12 which is provided with a central opening within which the upper end of the battery protrudes and through which the electrical connections are made. The top plate extends over the upper end of the battery and is secured to the bottom plate by bolts or screws 13 which screw into appropriate holes in the base plate. The bottom plate is provided with a recess 14 which receives the bottom of the battery for aiding in alignment and securing the battery in place. The upper plate is provided with a recess 15 in the bottom surface thereof which receives therein one end of a collar 16 that fits tightly over the upper end of the battery. The tight fitting collar increases the surface contact between the top of the battery to the top plate thereby dissipating more heat from the battery to the top plate.

The screws clamp the upper and lower plates firmly about the ends of the battery to provide sufficient pressure on the battery case to prevent the bottom of the battery from bowing outward from application of internal pressure resulting from heat within.

The bottom surface of the top plate and the upper surface of the bottom plate are anodized thereby providing electrical insulation between the battery ends and the plates. Thus, the anodized top and bottom plates provide two electrically insulated but thermally conductive paths through which heat may be dissipated to the frame of the spacecraft. The entire bottom of the battery dissipates heat to the bottom plate whereas the upper end of the battery dissipates heat through the collar to the upper plate and through the contact between the upper end of the battery and the top plate.

The battery holder is provided with a side wall container 17 which fits over the upper plate with a tight fit and which joins with the bottom plate at the outer surface. The container 17 is secured in place by a ring that fits over the bolts and extends from the upper plate over the upper end of the container. The joined surfaces at the bottom plate are cut at a 45° angle to provide a good surface fit. The inside surface 18 of the side wall container is painted black to aid in absorbing the heat radiating from the battery casing which is also painted black. The outside surface of the container is also coated black to further radiate heat to the inside surface of the satellite skin.

All metal-to-metal surfaces including those between the battery and anodized areas of the upper and lower plates are covered with a suitable low-vapor pressure heat conducting grease. Therefore, the grease aids in making a good thermal contact between the battery, the collar, and the upper and lower plates. Therefore, the battery heat is free to flow from the battery to the contacting metal elements.

Storage batteries such as used in satellites are made with stainless steel casing. In order to improve the heat conduction along the surface of the battery casing, the surface is plated with a copper coating. A suitable coating has been found to be about 0.003 inch. The copper coating on the side walls of the battery may be coated with black paint or other high emissivity coating to further improve the transfer of heat through radiation from the battery to the side wall. The upper and bottom surfaces of the battery are not painted black since they are in physical contact with heat dissipating surfaces.

In use, the battery holder is secured by the bottom plate to the usual honeycomb structure which is secured to the satellite skin thereby securing the battery in place. A plurality of battery holders may be used to secure a plurality of batteries in a battery pack. The number of storage batteries needed is dictated by the equipment to be used aboard and the number of solar cells used to generate the electrical energy for storage and use.

It is well known in the art that several cells may be secured together in order to form a battery. The holder is also useful in securing cells in place as described above for batteries.

Obviously many modifications and variations of the present invention are possible in the light of the above teachings. It is therefore to be understood that within the scope of the appended claims the invention may be practiced otherwise than as specifically described.

What is claimed is:

1. A battery holder for dissipating heat to the skin of a satellite from a battery held therein; which comprises, a bottom plate, an upper plate including a central aperture therein, an anodized recess within the bottom surface of said upper plate near the central aperture therein, a collar which surrounds a battery held in said holder in heat conducting contact therewith, said collar having a portion thereof which is secured within said anodized recess in said upper plate, a heat dissipating container enclosing said upper and lower plates in heat dissipating contact therewith, holder means extending between said upper and lower plates for holding a battery therebetween within said container and anodized battery contacting surfaces an said upper and lower plates for insulating the upper and lower plates from a battery held therebetween and for dissipating heat through said plates.

2. A battery holder as claimed in claim 1; in which, said bottom plate includes an anodized recess within which the adjacent end of a battery held therein fits.

3. A battery holder as claimed in claim 1; which includes a suitable low-vapor pressure heat conducting grease covering all metal-to-metal joined surfaces.

* * * * *